Dec. 31, 1957  W. E. McKINLEY  2,818,167
HOLDER FOR STICK TYPE MEDICATORS, COSMETICS
AND TOILET PREPARATIONS
Filed Jan. 22, 1954

WALTER E. MC KINLEY,
INVENTOR.

HUEBNER, BEEHLER,
WORREL & HERZIG,
ATTORNEYS.

BY

United States Patent Office 2,818,167
Patented Dec. 31, 1957

2,818,167

HOLDER FOR STICK TYPE MEDICATORS, COSMETICS AND TOILET PREPARATIONS

Walter E. McKinley, Los Angeles, Calif., assignor, by mesne assignments, to Crown Cork and Seal Company, Baltimore, Md., a corporation of Maryland Application January 22, 1954, Serial No. 405,573

4 Claims. (Cl. 206—56)

This invention relates to improvements in appliances or holders for projectable sticks.

The appliance of this invention is especially useful as a holder for medicators, cosmetics and toilet preparations put up in stick form. Thus, for example, the appliance may be used to hold a cerate, such as camphor ice, for external medicinal use. It may contain a perfume or cologne in stick form, or a deodorant. As some of these substances deteriorate on standing, it is an important object of this invention to provide an appliance of the above mentioned character which may be made air-tight for improving the shelf life of the substance contained in the appliance.

Another object of this invention is to provide a practical and efficient appliance of the above mentioned character which will operate easily nd effectively in projecting a stick of the type herein contemplated, and in retracting the stick back into its container following its use.

A further object of this invention is to provide an improved holder for stick type preparations, and which is of simple construction and can be produced inexpensively with the view to supplying the public with an efficient holder at small cost.

Figure 1:
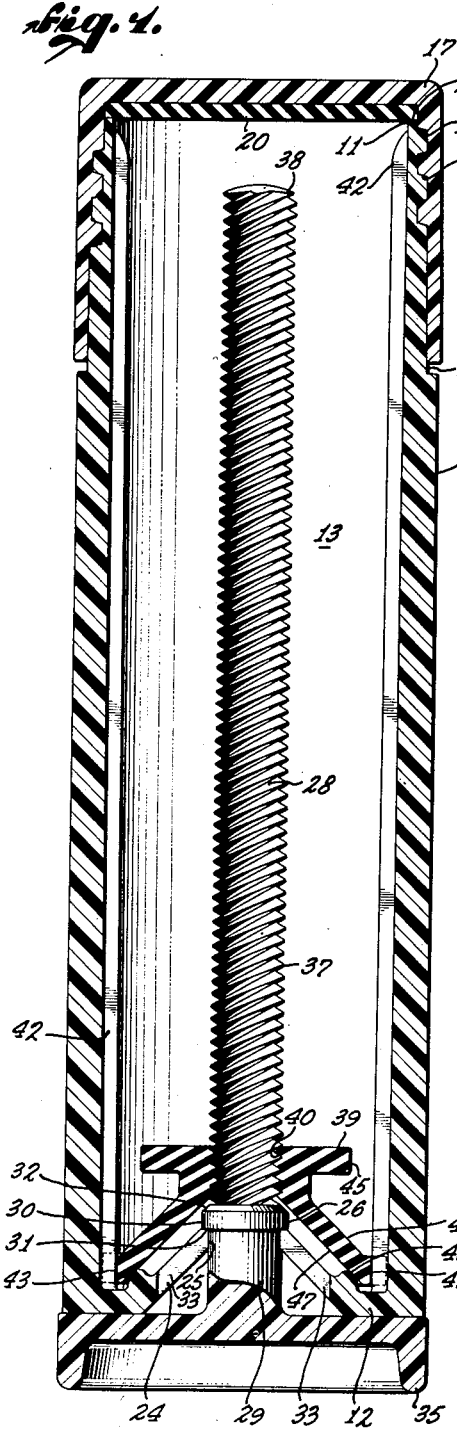
Figure 2:
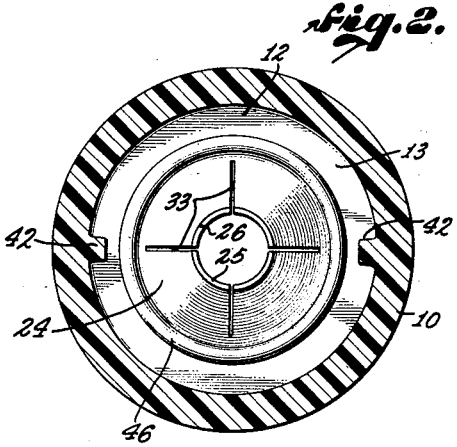

Further objects and advantages of the invention will be apparent during the course of the following part of this specification wherein the details of construction and mode of operation of a preferred embodiment of the invention are described with reference to the drawings, in which:

Figure 1 is a central longitudinal section through an appliance embodying my invention; and Figure 2 is a cross-sectional view of the body portion of the appliance taken in a direction toward the inside face of the bottom wall of the body portion.

In the drawings, the numeral 10 designates a tubular body portion, which is preferably circular in cross-section. This tubular body portion is open at one end 11 and closed at its opposite end by an end wall 12. The chamber formed in the tubular body is designated by the reference numeral 13, and in the embodiment shown in the drawings such chamber is circular in cross-section and extends axially of the elongated body 10.

Chamber 13 is filled with the composition which, at least under normal temperatures, is solid and capable of being formed as a stick so that it may be projected outwardly from the chamber. When it is intended that the appliance be used as a holder for a stick containing cologne, for example, and the composition of such cologne stick is liquid when heated, the composition may be poured into the chamber 13 and allowed to cool to a solid form. Upon cooling the composition shrinks slightly permitting the solid stick to slide easily out of the chamber when the appliance is operated as will be described more fully hereinafter. Also, in this connection, many of the compositions that may be put up in a form suited for use with the appliance of this invention are somewhat waxy or unctuous in character, and thus they lubricate the side walls of the chamber 13 permitting the stick to slide easily out of and into the chamber. Sliding of the solid stick composition from the chamber is further made easier by slightly tapering the walls of the chamber 13 so that the cross-sectional area of the chamber increases gradually in a direction from the closed end 12 to the open end 11 of the tubular body.

The body portion 10 is preferably formed of reduced outer diameter at its open end 11, as shown at 16 for accommodating the side walls of a cap 17. The cap is held on the end 11 as by complementary screw threads 18 around the body 11 and threads 19 on the cap. Covering the inner face of the cap 17 is a diaphragm 20 formed of a suitable resilient material, such for example as pulp having a vinyl coating on its exposed surface. Thus when the cap 17 is tightened on the open end of the body 11 the diaphragm 20 becomes pressed against rim 21 of the body to tightly seal the chamber 13.

Referring now to the structure for the closed end of the body 10, it is seen that end wall 12 has a center portion 24 thereof formed as a truncated cone projecting inwardly of the chamber 13, and having an axially arranged circular opening 25 through the end wall. The diameter of opening 25 is smaller than that of the top flat surface of the truncated center portion 24 to provide an annular shoulder 26.

Opening 25 receives a round stem 28 which extends axially into the chamber 13 and terminates short of the cap 17. The stem 28 has a neck portion 29 of a diameter approximating that of the opening 25 whereby the neck portion is journalled in the opening. There is an annular ridge 30 around the stem 28 providing an edge 31 which seats against the shoulder 26 of the end wall 12 and prevents outward axial movement of the stem from the opening 25. There is a plurality of radially extending slits 33 in the end wall and these are cut through the periphery of the opening 25 to permit expansion of the opening sufficiently to allow the annular ridge 30 to pass through the opening when the stem is inserted into the chamber. The inner edge of the ridge 30 is beveled as shown at 32 making insertion of the ridge through the opening 25 easier. Beveled edge 32 also serves as a seat in a sealing arrangement which will be described later in this specification.

Formed integral with the neck portion 29 of the stem 28 is a head member 35 which constitutes a means for effecting rotation of the stem. Head member 35 is preferably circular in plan and of a diameter corresponding to that of the body portion 10. The annular ridge 30 on the stem 28 is spaced from the inside face of the head member 35 by an axial distance equal to the height of the shoulder 26 from the outer face of the closed end of the tubular body. Thus the head member 35 prevents axial movement of the stem 28 into the chamber 13.

The stem 28 is screw threaded around its periphery with a continuous helical rib 37 extending from the free end 38 of the stem down to the annular ridge 30 to receive a nut or pusher member 39 having an internally threaded opening 40 mating with the screw threads 37 on the stem. Nut 39 is formed of a suitable flexible material such, for example, as rubber or a commercial plastics material of the soft type, such as polyethylene. The stem 28, on the other hand, is formed of a hard material such, for example, as a hard type commercial plastics material (e. g. polystyrene).

Nut 39 has a truncated conical lower portion 41 of a form resembling that of the truncated center portion 24 of the end wall 12, and is arranged to be moved axially in the chamber 13 on the stem 28 throughout the full length of that portion of the stem lying above the annular ridge 30. Rotation of the nut 39 in the chamber 13 is prevented by being in sliding engagement with at least a portion of the walls of the chamber 13. In the embodiment shown in the drawings, the diameter of the lower portion 41 is slightly less than the diameter of the chamber 13, and engagement of the nut 39 with the wall of the chamber 13 is provided by means of axially directed guide rails 42 on the walls of the chamber 13, which engage with notches 43 cut from the perimeter of the base of the truncated portion 41 of the nut to form a keyway arrangement preventing rotation of the nut in the chamber.

There is a laterally extending flange portion 45 on the nut 39, which flange portion is spaced axially from the truncated portion 41, and is of smaller transverse dimensions than the chamber 13 whereby it is spaced from the walls of the chamber. In filling the chamber 13 with a melted composition which upon solidification thereof forms a stick as referred to above, such melted composition will flow between the rim of the flange portion 45 and the walls of the chamber and into the space existing between the flange portion and the truncated lower portion of the nut 39. Thus upon solidification of the stick composition, the flanged portion of the nut member becomes firmly anchored in the inner end of the stick and the nut 39 will carry the stick along with it as the nut is moved upwardly or downwardly on the stem 28 when the stem is rotated.

There is an annular ridge 46 extending inwardly from the inner face of the end wall 12 which ridge becomes engaged with the inside face 47 of the truncated conical portion of the nut when the nut is moved to its lowermost position in the chamber 13, whereby the nut seats against the rim of the annular ridge 46 forming an air-tight seal which prevents entry of air around the periphery of the truncated portion of the nut. Sealing against entry of air into the chamber through the central opening 40 of the nut is provided by the beveled edge 32 on the annular ridge 30 of the stem 28, providing a seat against which the underface 47 of the nut engages when the nut is moved to its lowermost position in the chamber 13. In the drawings the nut is shown in sealing engagement with the annular ridge 46 prior to its engagement with the beveled edge 32. Improved sealing against entry of air through the slots 33 in the end wall 12 and past the nut 39 is had by dimensioning the parts forming the sealing surfaces for the two seals mentioned above in such a way that the nut contacts the annular ridge 46 prior to contacting the beveled edge 32. For this purpose the diameter of the base portion 41 is slightly smaller than the diameter of the chamber 13. As the nut is formed of an elastomeric material, it will become flared outwardly upon engagement with the annular ridge 46 permitting it then to contact the beveled edge 32. Efficient sealing of the closed end of the chamber 13 has been provided in one instance wherein the beveled edge 32 becomes engaged with the underface 47 of the nut 39 upon axial movement of the nut approximately $10/1000$ of an inch after having been seated against the annular ridge 46, i. e., the nut 39 may be moved approximately $10/1000$ of an inch toward the end wall 12 following contact with the annular ridge 46.

It is to be understood that the form of my invention, herein shown and described, is a practical and preferred embodiment of the same and that various changes may be resorted to without departing from the spirit of the invention or the scope of the claims.

Having described my invention, what I claim as new and desire to secure by Letters Patent is:

1. An appliance adapted to contain a projectable stick comprising a tubular body of circular internal cross-section, said body being open at one end thereof, a cap for sealing said one end, an end wall on the other end of said body, the center portion of said end wall projecting inwardly of said body and being of circular cross section, an axial opening through said center portion, a stem extending axially in said body and being journalled in said opening, an annular ridge around said stem preventing outward axial movement of said stem from said opening, abutment means integral with said stem and external of said body for preventing axial movement of said stem inwardly of said opening, nut means in said body and screwed on said stem, guide means between said nut means and said body for preventing rotation of said nut means and permitting axial movement thereof whereby rotation of said stem will cause said nut means to move in an axial direction in said body, said nut means being formed of flexible elastomeric material, said nut means comprising a radially outwardly extending annular flanged upper portion of smaller diameter than said body for imbedding said stick and a truncated conical lower portion engageable with said end wall and with said annular ridge for sealing said other end of said body.

2. The appliance of claim 1 including a plurality of slits through said center portion of said end wall and communicating with said opening to permit expansion of said opening for receiving said annular ridge.

3. An appliance adapted to contain a projectable stick comprising a tubular body of circular internal cross-section, said body being open at one end thereof, a cap for sealing said one end, an end wall on the other end of said body, a center portion of said end wall projecting inwardly of said body and being of circular cross-section, an axial opening through said center portion, a stem extending axially in said body and being journalled in said opening, an annular ridge around said stem preventing outward axial movement of said stem from said opening, a plurality of slits through said center portion of said end wall and communicating with said opening therein and providing spring fingers permitting expansion of the opening for receiving said annular ridge with the fingers snapped in position externally of the ridge, abutment means connected for rotation with said stem in spaced relation to said ridge and disposed external of said body for preventing axial movement of said stem inwardly of said opening, said stem being insertable while connected to said abutment means into said axial opening.

4. An appliance adapted to contain a projectable stick comprising a tubular body member of circular internal cross-section, said body being open at one end thereof, a cap for sealing said one end, an end wall on the other end of said body, a center portion of said end wall projecting inwardly of said body and being of circular cross-section, an axial opening through said center portion, a stem extending axially in said body and being journalled in said opening, an annular ridge around said stem preventing outward axial movement of said stem from said opening, a plurality of slits through said center portion of said end wall and communicating with said opening therein to permit expansion of the opening for receiving said annular ridge, the edges defining said opening contacting the underside of said annular ridge whereby outward axial movement of said stem from said opening is prevented, abutment means connected for rotation with said stem in spaced relation to said ridge and disposed external of said body for preventing axial movement of said stem inwardly of said opening, said stem being insertable while connected to said abutment means into said axial opening to position the ridge internally of the adjacent end wall and to position the abutment means externally of the adjacent end wall, nut means in said body and screwed on said stem, whereby rotation of said stem will cause said nut means to move in an axial direction in said body.

References Cited in the file of this patent

UNITED STATES PATENTS

| 1,461,680 | Rott | July 10, 1923 |
|---|---|---|
| 1,499,784 | Recker | July 1, 1924 |
| 1,614,461 | Doi | Jan. 18, 1927 |
| 1,890,348 | Weatherhead | Dec. 6, 1932 |
| 2,101,132 | Daly | Dec. 7, 1937 |
| 2,329,367 | Weisenberg | Sept. 14, 1943 |
| 2,457,342 | Braselton | Dec. 28, 1948 |
| 2,586,765 | Onkey | Feb. 19, 1952 |
| 2,666,940 | Davison | Jan. 26, 1954 |